(12) United States Patent
Müller et al.

(10) Patent No.: US 8,096,529 B2
(45) Date of Patent: Jan. 17, 2012

(54) SEMITRAILER LANDING GEAR

(75) Inventors: Gerald Müller, Obertshausen (DE);
Günter Seidel, Riedstadt (DE); José Algüera, Aschaffenburg (DE)

(73) Assignee: Jost-Werke GmbH, Neu-Isenburg ( * ) Notice: Subject to any disclaimer, the term of this patent is extended or adjusted under 35 U.S.C. 154(b) by 1030 days.

(21) Appl. No.: 11/989,129

(22) PCT Filed: Jul. 20, 2006

(86) PCT No.: PCT/EP2006/007143
§ 371 (c)(1),
(2), (4) Date: Jan. 22, 2008

(87) PCT Pub. No.: WO2007/012424
PCT Pub. Date: Feb. 1, 2007

(65) Prior Publication Data
US 2009/0090896 A1    Apr. 9, 2009

(30) Foreign Application Priority Data
Jul. 23, 2005  (DE) .................... 10 2005 034 552

(51) Int. Cl.
*B60S 9/02* (2006.01)
(52) U.S. Cl. ......... 254/419; 254/425; 254/418; 254/420
(58) Field of Classification Search .......... 254/419, 254/425, 418, 420; 280/475, 764.1, 765.1, 280/766.1; 248/499, 500, 200.1, 352, 354.5, 248/688, 125.8
See application file for complete search history.

(56) References Cited

U.S. PATENT DOCUMENTS

| | | | | |
|---|---|---|---|---|
| 1,580,571 A | * | 4/1926 | Putzke | 254/418 |
| 2,041,376 A | * | 5/1936 | Schmidt | 74/575 |
| 2,249,050 A | * | 7/1941 | Schmidt | 254/111 |
| 2,571,390 A | * | 10/1951 | Strand | 280/475 |
| 3,921,958 A | * | 11/1975 | Brockelsby et al. | 254/420 |
| 5,199,738 A | | 4/1993 | VanDenberg | |
| 5,307,601 A | * | 5/1994 | McCracken | 52/364 |
| 5,426,906 A | * | 6/1995 | McCracken | 52/650.1 |
| 6,020,039 A | * | 2/2000 | Cline et al. | 428/36.9 |
| 6,592,363 B2 | * | 7/2003 | Hoffmann | 431/320 |
| 6,598,886 B2 | * | 7/2003 | Baird et al. | 280/6.155 |
| 6,782,832 B2 | * | 8/2004 | Reichel et al. | 104/124 |
| 2003/0183033 A1 | * | 10/2003 | Peveler | 74/342 |
| 2005/0167644 A1 | * | 8/2005 | Deupree | 256/32 |
| 2005/0196249 A1 | * | 9/2005 | Huang | 411/60.1 |

FOREIGN PATENT DOCUMENTS

| | | |
|---|---|---|
| DE | 38 29 131 A1 | 9/1990 |
| DE | 100 07 496 C1 | 4/2001 |
| EP | 0 380 941 A2 | 8/1990 |
| EP | 1 104 369 B1 | 1/2003 |
| GB | 85 12 142 U1 | 7/1985 |

* cited by examiner

*Primary Examiner* — George Nguyen
(74) *Attorney, Agent, or Firm* — Hudak, Shunk & Farine Co. LPA

(57) ABSTRACT

A semitrailer landing gear, particularly for supporting trailers, including a supporting element, which can be telescopically displaced in the height thereof and which has an outer sleeve and an inner sleeve, the outer sleeve having a fastening flange for placing on a vehicle. The aim of the invention is to develop semitrailer landing gears with a reduced weight as well as with favorable manufacturing costs. To this end, the invention provides that at least one lateral wall of the outer sleeve and/or of the inner sleeve is provided with an angled wall section extending in an axial direction.

20 Claims, 1 Drawing Sheet

SEMITRAILER LANDING GEAR

FIELD OF INVENTION

The invention concerns a support jack, especially for propping up trailers, with a vertically telescopic support element having an outer sleeve and an inner sleeve, while the outer sleeve has a fastening flange for placement on a vehicle.

BACKGROUND OF THE INVENTION

Such support jacks are used in particular to prop up the trailers of a tractor-trailer rig. These support jacks are made from rectangular tubes, placed one inside the other and able to move relative to each other, as is known for example from EP 1 104 369 B1.

Since the support jacks are usually mounted onto commercial vehicles and thereby reduce the payload, there have long been efforts to make the support jacks of the lightest possible construction. This goal would also be achieved by the use of aluminum as the material, such as is described in EP 0 380 941 A2. In the case of this support device, an outer sleeve is extruded as a single piece with its fastening plate for mounting the support device onto a vehicle. Since the rough casting is in block form, this method is confined to light metals. But support devices made of light metal have not been successful on the market, since they are costly because of the high-value material and they have proven to be prone to breakdown in operational use, due to the low material strength.

Another possibility of making lighter support jacks consists of designing the outer and inner sleeves with thinner walls. This step, furthermore, leads to distinctly more favorable manufacturing expenses. But then the support jacks have a greater vulnerability to mechanical strains.

SUMMARY OF THE INVENTION

Consequently, the problem of the invention is to develop support jacks with reduced weight and at the same time more favorable manufacturing expenses.

This problem is solved by a support jack in which at least one sidewall of the outer sleeve and/or the inner sleeve is designed with an angled wall section extending in the axial direction.

Thanks to the angled wall section of the outer and/or inner sleeve, the support jack is able to withstand much higher flexural torques. For this, the angled wall section should be angled by 5 to 30 degrees, especially preferably 15 to 25 degrees, relative to the side wall. The angled wall section should not extend beyond half the width of the side wall, or else the desired stiffening effect will be reduced.

In one preferred embodiment, one angled wall section is arranged in each of two opposite side walls. This, on the one hand, ensures an even greater bending strength, without added expense during the fabrication.

It has also proven to be beneficial for the angled wall section to have a first segment bordering on the fastening flange and a second segment bordering on the opposite side wall. In this orientation, the side walls lie with their angled wall sections transverse to the direction of travel, that is, in the direction of the longitudinal axis of the vehicle. For the support jacks are subjected to impact in the direction of the longitudinal axis of the vehicle during the coupling and uncoupling process, and these will then be absorbed without a deformation of the material of the outer and/or inner sleeve.

Advantageously, the angled wall section is oriented outward in the direction of the fastening flange with respect to the side wall. This embodiment also leads to a greater stiffness as compared to an embodiment in which the angled wall section is inwardly inclined.

Favorably, the angled wall section of the outer sleeve and the inner sleeve are arranged complementary to each other. This has the advantage that the inner sleeve rests against the inside of the outer sleeve by its entire outer circumference and moves without twisting and with little play through the outer sleeve during the retraction or extension of the support jack.

The outer sleeve and the fastening flange can be fabricated as a single piece by means of edge rolling from a piece of flat steel, just like the inner sleeve. In most cases, cold working is done; only in special instances, with large cross sections or very small bending radius, is the material heated in order to reduce the forces needed for the shaping. The major benefit of edge-rolled as opposed to extruded sleeves lies in the almost free choice of the alloy for the platelike starting material. Furthermore, it is not necessary to connect individual structural parts by a plurality of welded seams, which are difficult to fabricate. Thanks to the relatively short bending process of the material, very large numbers of pieces can be produced per unit of time.

In one particular embodiment, the outer sleeve and/or the inner sleeve has at most one welded seam. This type of material joint produces sleeves with a self-contained hollow body, which further increases the bending strength. The welded seam can be located in a position very favorable to the fabrication, for example, on the side wall close to the fastening flange.

It has been found to be especially advantageous when the connection seam is arranged in the axial direction of the outer sleeve. The welded seam can then run down the middle through one side wall of the sleeve or in the connection region between two neighboring side walls.

BRIEF DESCRIPTION OF THE DRAWING

For a better understanding, the invention will now be explained more closely by means of the single drawing wherein.

DETAILED DESCRIPTION OF THE INVENTION

Figure 1:
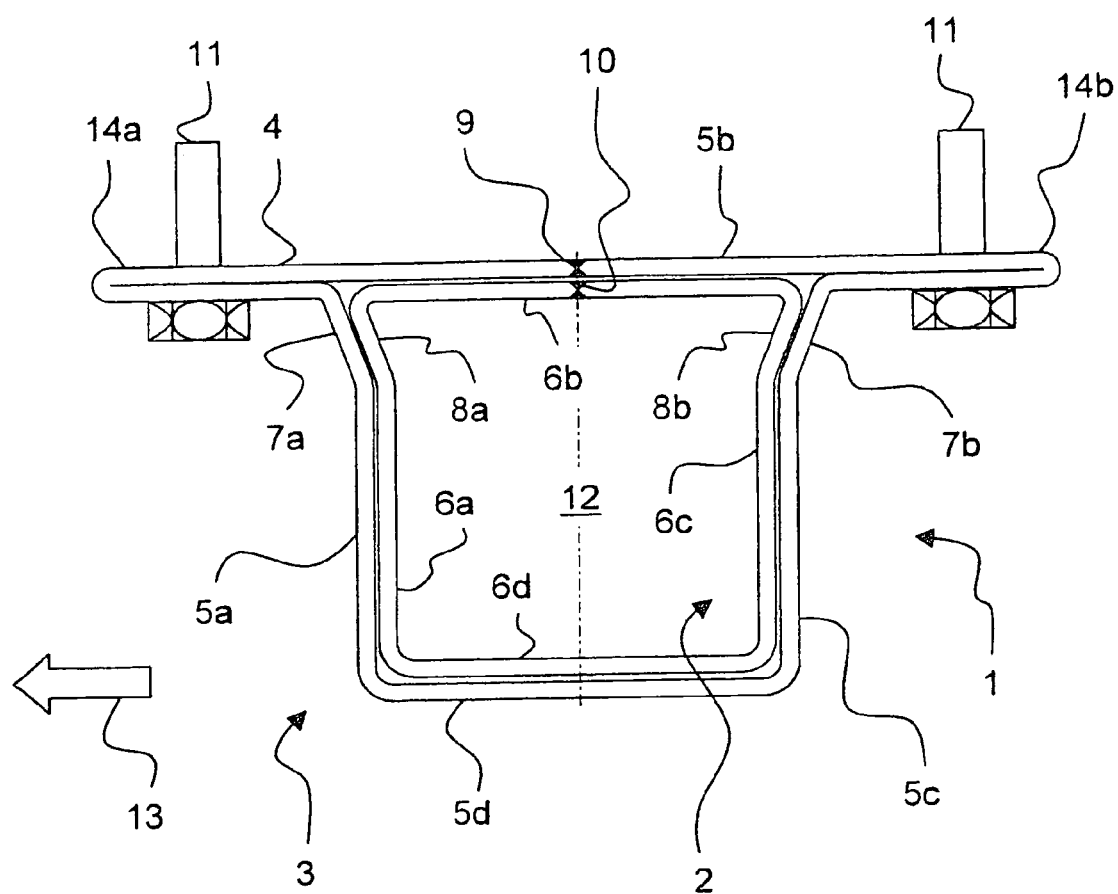
FIG. 1 is a plan view of an outer sleeve of a support element, with an inner sleeve arranged inside.

The FIGURE shows a plan view of an outer sleeve 1 of a support element 3, with inner sleeve 2 arranged inside. The outer sleeve 1 comprises the side walls 5a-d, which surround a basically rectangular inner space 12.

The side wall 5b has a connection weld 9 in its axis of symmetry, which joins together both halves of the side wall 5b. By means of the side wall 5b, the entire support jack is placed via the outer sleeve 1 onto a vehicle, not shown. For this, a fastening flange 4 projecting laterally beyond the side walls 5a, 5c is formed on the side wall 5b on either side of the connection weld 9.

The side walls 5a-d are formed from an originally platelike starting material by bending and consequently pass into each other without seams. At each end segment 14a, 14b of the fastening flange 4 one notices a bend-around, where the material is bent by 180 degrees. In the embodiment shown in the drawing, this is a sharp bend-around, which has been rolled again after the bending process, so that the wall material in the region of the bend-around again lies against each other.

In the usual installation procedure, the side walls 5a, 5c of the outer shell 1 are at right angles to the direction of travel 13 and the side walls 5b, 5d lie in this direction. To increase the stability, the opposite side walls 5a, 5c are provided with angled wall sections 7a, 7b, which are set outward by around 20 degrees in the direction of the fastening flange 4. Thanks to this structural measure, it is possible to have thinner material for the outer sleeve 1 with the same stability. The side walls 5a, 5c are formed with the angled wall section 7a, 7b so that they can withstand the higher forces acting upon the trailer (not shown) when coupling it in or against the direction of travel 13.

For the fastening onto a vehicle (not shown), fastening bolts 11 are inserted into boreholes, also not visible in the plan view. The fastening bolts 11 project out beyond the plane surface of the side wall 5b with its fastening flange 4.

The inner sleeve 2 was likewise formed from a platelike starting material by edge rolling and joined into a closed hollow body by the connection weld 10. The connection weld 10 is likewise situated in the axis of symmetry and is arranged immediately next to the connection weld 9.

The inner sleeve 2 is formed as a rectangular tube with two pairs of opposite side walls 6a-d of equal length, the side walls 6a, 6c having angled wall sections 8a, 8b complementary to the side walls 5a, 5c. As a result of this, on the one hand, the maximum withstandable flexural torque is increased and on the other hand a good axial guidance is provided for the inner sleeve 2 relative to the outer sleeve 1.

LIST OF REFERENCE SYMBOLS

1 outer sleeve
2 inner sleeve
3 support element
4 fastening flange
5a-d side wall, outer sleeve
6a-d side wall, inner sleeve
7a, 7b angled wall section, outer sleeve
8a, 8b angled wall section, inner sleeve
9 connection weld, outer sleeve
10 connection weld, inner sleeve
11 fastening bolt
12 inner space
13 direction of travel
14a, 14b end segment, fastening flange

What is claimed is:

1. A support jack, especially for propping up trailers, comprising: a vertically telescopic support element having an outer sleeve and an inner sleeve, wherein the outer sleeve has a fastening flange for placement on a vehicle, wherein at least one side wall of both the outer sleeve and the inner sleeve are designed with an angled wall section extending in an axial direction.

2. The support jack per claim 1, wherein one angled wall section is arranged in each of two opposite side walls.

3. The support jack per claim 1, wherein the angled wall section has a first segment bordering on the fastening flange and a second segment bordering on the opposite side wall.

4. The support jack per claim 1, wherein the angled wall section is oriented outward in the direction of the fastening flange with respect to the side wall.

5. The support jack per claim 1, wherein the angled wall section of the outer sleeve and the inner sleeve are arranged complementary to each other.

6. The support jack per claim 1, wherein the outer sleeve and the fastening flange are fabricated as a single piece by edge rolling from a piece of flat steel.

7. The support jack per claim 1, wherein the inner sleeve is fabricated as a single piece by means of edge rolling from a piece of flat steel.

8. The support jack per claim 1, wherein the outer sleeve or the inner sleeve or a combination thereof has at most one welded seam.

9. The support jack per claim 1, wherein the connection weld is arranged in an axial direction of the outer sleeve or the inner sleeve or a combination thereof.

10. The support jack per claim 2, wherein the angled wall section has a first segment bordering on the fastening flange and a second segment bordering on the opposite side wall.

11. The support jack per claim 10, wherein the angled wall section is oriented outward in the direction of the fastening flange with respect to the side wall.

12. The support jack per claim 11, wherein the angled wall section of the outer sleeve and the inner sleeve are arranged complementary to each other.

13. The support jack per claim 12, wherein the outer sleeve and the fastening flange are fabricated as a single piece by edge rolling from a piece of flat steel.

14. The support jack per claim 13, wherein the inner sleeve is fabricated as a single piece by means of edge rolling from a piece of flat steel.

15. The support jack per claim 14, wherein the outer sleeve or the inner sleeve or a combination thereof has at most one welded seam.

16. The support jack per claim 15, wherein the connection weld is arranged in an axial direction of the outer sleeve or the inner sleeve or a combination thereof.

17. A support jack, especially for propping up trailers, comprising: a vertically telescopic support element having an outer sleeve and an inner sleeve, wherein the outer sleeve has a fastening flange for placement on a vehicle, wherein at least one side wall of both the outer sleeve and the inner sleeve are designed with an angled wall section extending in an axial direction, and wherein the angled wall section is angled by 5 to 30 degrees relative to the respective side wall.

18. The support jack per claim 17, wherein one angled wall section is arranged in each of two opposite side walls, and wherein the angled wall section has a first segment bordering on the fastening flange and a second segment bordering on the opposite side wall.

19. The support jack per claim 18, wherein the angled wall section is oriented outward in the direction of the fastening flange with respect to the side wall, and wherein the angled wall section of the outer sleeve and the inner sleeve are arranged complementary to each other.

20. The support jack per claim 19, wherein the inner sleeve is fabricated as a single piece by means of edge rolling from a piece of flat steel, wherein the outer sleeve or the inner sleeve or a combination thereof has at most one welded seam, and wherein the connection weld is arranged in an axial direction of the outer sleeve or the inner sleeve or a combination thereof.

* * * * *